United States Patent [19]

Clark

[11] Patent Number: 4,829,124
[45] Date of Patent: May 9, 1989

[54] DYNAMICALLY CROSSLINKED THERMOPLASTIC ELASTOMER

[75] Inventor: Lawrence Clark, Lancaster, Pa.

[73] Assignee: Armstrong World Industries, Inc., Lancaster, Pa.

[21] Appl. No.: 161,516

[22] Filed: Feb. 29, 1988

Related U.S. Application Data

[63] Continuation-in-part of Ser. No. 931,389, Nov. 17, 1986, abandoned.

[51] Int. Cl.$^4$ .......................... C08L 9/02; C08L 23/34; C08L 33/02; C08L 7/00
[52] U.S. Cl. .................................... 525/108; 525/116; 525/119; 525/186; 525/199
[58] Field of Search ................ 525/108, 119, 116, 65, 525/186, 193

[56] References Cited

U.S. PATENT DOCUMENTS

| | | | |
|---|---|---|---|
| 3,862,066 | 1/1975 | Reiter et al. | 524/114 |
| 3,905,931 | 9/1975 | Ziegert | 525/108 |
| 4,451,506 | 5/1984 | Kobayashi et al. | 525/108 |
| 4,578,425 | 3/1986 | Santorelli | 525/108 |
| 4,690,856 | 9/1987 | Ito et al. | 525/420 |

FOREIGN PATENT DOCUMENTS

| | | | |
|---|---|---|---|
| 50-124938 | 10/1975 | Japan | 525/119 |
| 56-135579 | 10/1981 | Japan | 525/119 |
| 58-176958 | 10/1983 | Japan | 525/119 |
| 61-118443 | 6/1986 | Japan | 525/108 |
| 61-155483 | 7/1986 | Japan | 525/108 |

Primary Examiner—John C. Bleutge
Assistant Examiner—Robert E. L. Sellers

[57] ABSTRACT

A thermoplastic elastomer is described which comprises a blend of (a) a carboxylated butadieneacrylonitrile elastomer and (b) an ethylene/acrylic acid copolymer which has been at least partially neutralized with a metal ion, the blend of (a) and (b) having been dynamically crosslinked with an epoxy crosslinking agent having a minimum of 2 epoxy moieties per molecule.

27 Claims, No Drawings

DYNAMICALLY CROSSLINKED THERMOPLASTIC ELASTOMER

BACKGROUND OF THE INVENTION

This is a continuation-in-part application of U.S. Patent Application Ser. No. 931,389, filed on 11/17/86, now abandoned.

FIELD OF THE INVENTION

This invention relates to a particular type of thermoplastic elastomer produced from the dynamic crosslinking of a carboxylated butadiene-acrylonitrile elastomer and an ionomeric ethylene-acrylic acid copolymer using an epoxy crosslinking agent having a minimum of two epoxy moieties per molecule (a polyfunctional epoxy). The compositions of the instant invention can provide a thermoplastic elastomer having both the advantage of an easily processed thermoplastic elastomer and superior physical properties of conventional vulcanized rubbers. It is furthermore within the scope of the instant invention to include materials such as filters, pigments, and plasticizers in order to provide, modify, or enhance a particular characteristic such as color, flexibility or hardness.

The compositions of the instant invention can be used to provide articles such as hoses, belts, wire and cable insulation, foot wear, mechanical goods and a wide variety of other rubber products. These thermoplastic elastomers can be extruded, injection-molded, or calendered.

The present invention provides a thermoplastic elastomer characterized by the presence of both ionic bonds and covalent bonds. The ionic bonds are formed by the partial neutralization of the carboxyl groups on both polymers. The covalent bonds are formed by the reaction of the polyfunctional epoxy crosslinker with the carboxyl groups present in both the elastomer and ionomeric copolymer. The presence of both ionic and covalent bonds provides a thermoplastic elastomer having the easy processing characteristics which are typical to ionic polymers and also provides superior physical properties.

SUMMARY OF THE INVENTION

The instant invention provides a thermoplastic elastomer having both superior physical characteristics, and superior processing capabilities allowing it to be easily processed. Such a thermoplastic elastomer comprises: a dynamically crosslinked blend of: (a) a carboxylated butadiene-acrylonitrile elastomer (XNBR) and (b) and ethylene/acrylic acid copolymer which has been at least partially metal ion neutralized (an ionomer of ethylene and acrylic acid) wherein (a) and (b) have been dynamically crosslinked with polyfunctional epoxy crosslinking agent.

While the term acrylic acid is used throughout this description, suitable copolymers can be prepared from ethylene and a carboxylic acid monomer with the structural formula:

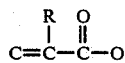

where R is hydrogen or a hydrocarbon group. While, suitably, R can be hydrogen, methyl, ethyl, or propyl, preferably, the copolymer is prepared using monomers where: (1) R was hydrogen or (2) R was a methyl group. Therefore, preferably the copolymer with ethylene monomer was also prepared with monomers selected from the group consisting of: acrylic acid and methacrylic acid. This preferred embodiment is indicated by: ethylene/(meth)acrylic acid copolymer.

The ethylene/acrylic acid copolymer must have been at least partially neutralized with a metal ion to provide ionic crosslinking in addition to the dynamic crosslinking. An acceptable minimum amount of metal ion is that amount of metal needed to provide 0.5 parts of metal per 100 parts of total polymer.

The polyfunctional epoxy crosslinking agent can be any compound having more than one epoxy moiety.

The polyfunctional epoxy crosslinker should be present in the amount needed to provide a minimum of 0.010 parts of oxirane oxygen per hundred parts of total polymers (PhP).

The thermoplastic elastomer can be prepared by dynamically crosslinking a homogeneous mixture of the XNBR and the ethylene/acrylic acid copolymer (or ionomer) with the crosslinker at elevated temperatures (preferably over 135° C.). Shear should be provided during corsslinking. If a metal salt is to be separately added, it can be mixed in either before or after dynamic crosslinking. The polyfunctional epoxy should either (a) be well blended before raising temperatures to induce dynamic crosslinking, or (b) be added carefully to the homogeneous blend during mixing; in order to obtain a uniformly crosslinked product. "Dynamic" crosslinking means that, while the crosslinking reaction occurs (with the polyfunctional epoxy), shear stress is applied to the mixture. Conventional vulcanization is avoided, and a product is produced which can be melted again and again (repeatedly) for combination with other ingredients or for forming into a finished product. The product can also be calendered, extruded, compression molded, and injection molded into a desired shape.

DETAILED DESCRIPTION

Permissively, the concentration of the NXBR, the epoxy crosslinker, the ethylene/acrylic acid copolymer and the neutralizing metal ion can all be widely varied. In this manner, a particularly desired characteristic can be obtained.

Broadly, the concentration of the carboxylated butadiene-acrylonitrile elastomer can range from about 90 to about 10 PhP. At the same time, the concentration of the ethylene/acrylic acid ionomer can broadly range from about 10 to about 90 parts per hundred parts of total polymer (PhP). The polyfunctional epoxy crosslinking agent should be present in an amount sufficient to provide a minimum of about 0.01 parts of oxirane oxygen PhP.

The preferred range for the carboxylated butadiene-acrylonitrile elastomer is from about 80 to about 15 PhP, while the most preferred concentration range is from about 75 to about 20 PhP. A preferred concentration range for the ionomer is from about 20 to about 85 PhP, while the most preferred concentration range is from about 25 to about 80 PhP.

Broadly, the oxirane oxygen level of the polyfunctional epoxy crosslinker can be in the range of from about 0.01 to about 7.0 PhP. A more preferred range, however, is from about 0.020 to about 3 PhP and the most preferred range is from about 0.030 to about 2.5 PhP.

Acceptably, there should be a minimum of 0.5 parts of the neutralizing metal ion PhP present in the elastomer-ionomer mixture in order to provide ionic bonding. An acceptable concentration range is from about .5 to about 30 parts of metal per hundred parts of resin. A more preferred range is from about 3 to about 15 parts per hundred parts of resin. An even more preferred range is from about 5 to about 10 parts of metal per hundred parts of resin. Similarly, there should be a minimum of 1 part of free acid (unneutralized acrylic acid after the addition of the metal ion but before crosslinking); PhP and preferably, two or more parts free acid PhP. A preferred range of unneutralized free acid is from about one to about 20 parts PhP.

Any polyfunctional epoxy compound can be used as the crosslinking agent for this composition. A variety of these compounds can be commercially obtained.

Polyfunctional epoxy crosslinking agent include (but are not limited to): compounds having the formula:

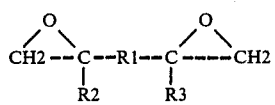

wherein R2 and R3 are selected from hydrogen and $CH_3$, and R1 can be: (a) an aliphatic hydrocarbon moiety having from 1 to 10 carbon atoms optionally being branched, linear, or cyclic; (b) —$CH_2OCH_2$—; (c) —$CH_2$—O—$(CH_2)_n$—O—$(CH_2)_n$—$OCH_2$— wherein each n can independently be a number from 2 to 8; (d) —$CH_2O$—$(CH_2)_n$—O—$CH_2$— wherein n is a number from 2 to 8; (e) —$C_6X$—; (f) —$CH_2$—O—$C_6X$—O—$CH_2$—; (g) —$CH_2$—$C_6X$—$OCH_2$— or (h) $CH_2$—$C_6X$—$CH_2$—; wherein $C_6X$ of (e) through (h) is an aromatic ring substituted with members represented by X, which are selected from hydrogen, fluorine, chlorine, bromine, and iodine, an aliphatic hydrocarbon group having from 1 to 10 carbon atoms, an aliphatic hydrocarbon epoxy group having from 2 to 10 carbon atoms, an ether having from 2 to 10 carbon atoms, an ester having from 2 to 10 carbon atoms, an epoxidized ether having from 3 to 12 carbon atoms, and an epoxidized ester having from 3 to 12 carbon atoms. An aliphatic hydrocarbon epoxy group is a hydrocarbon chain which is branched or linear, but has the epoxy moiety:

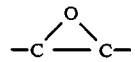

An example of an epoxy where R1 has the formula as described in (c) is glycol diglycidyl ether; an example where R1 has the formula as described in (d) above is butanediol diglycidyl ether, and an example where R1 has the formula described in (e) as $C_6X$, where X is hydrogen ($H_4$) is divinylbenzene dioxide, a polyfunctional epoxy of an aromatic compound.

Other polyfunctional epoxies of aromatic compounds includes (but is not limited to), the epoxidized glycidyl ethers of aromatic compounds, which, in turn, includes (1) polyglycidyl phenyl compounds such as: (a) 2,6-diglycidyl phenyl glycidyl ether, (b) 2-glycidyl phenyl glycidyl ether, and (c) tetraglycidoxy tetraphenylethane and (2) the polyglycidyl ethers of phenol such as: (a) digylcidyl ether of bisphenol A, (b) polyglycidyl ether of phenol, and (c) diglycidyl ether of tetrabromobisphenol. The term "epoxidized glycidyl ethers of aromatic compounds" thus refers to compounds which have two or more epoxy moieties, at least one aromatic moiety, and at least one glycidyl ether moiety and the term "polyfunctional epoxies of aromatic compounds" refers to any compound having two or more epoxy moieties and at least one aromatic moiety.

Another class of crosslinkers are linear, branched and cyclic hydrocarbon compounds, having 2 or more epoxy moieties. Permissively, these can include oxygen in and with the hydrocarbon chain forming one or more groups selected from ester and ether moieties. Preferred crosslinkers have from 1 to 4 of these ester and ether moieties. Usually the hydrocarbon portion is completely saturated, although some unsaturation might be found. Acceptably, such crosslinkers have from 4 to 28 carbon atoms. The simplest example of such cross-linkers is butadiene dioxide. Preferably, such cross-linkers have from 4 to 24 carbon atoms. Other preferred crosslinkers have 2 or more epoxy moieties on a linear or branched hydrocarbon chain.

Other polyfunctional epoxy crosslinking agents in this class can include: polyepoxidized cycloalkyl crosslinkers. Polyepoxidized cycloalkyl crosslinkers are crosslinking agents that have at least one of the epoxy groups on the hydrocarbon ring, but also can include a linear or branched saturated hydrocarbon moiety, optionally, having one or more epoxy moiety, an ester moiety, and an ether moiety. In crosslinkers having ester and ether moieties, preferably, there will be from 1 to 4. Preferably, these crosslinkers have from 8 to 28 carbon atoms. Specific examples of this type of crosslinker are vinyl cyclohexene dioxide and limonene dioxide. Other specific crosslinkers in this group are (1) epoxidized cyclic ethers such as bis (2,3,epoxy cyclopentyl) ether; and (2) epoxidized cycloalkyl carboxylate such as: 3,4-epoxy-6-methyl-cyclo-hexylmethyl 3,4-epoxy-6-methylcyclohexane carboxylate, and 3,4-epoxy cyclohexylmethyl - (3,4-epoxy) cyclohexane carboxylate.

Acceptably, one may select any one or more particular polyepoxy compound named above, although in making a suitable selection, one would not even have to be limited by those named above. Any polyepoxy compound may be used as a crosslinker. Since, however, there are some individual distinctions to be noted among the particular crosslinking compounds, preferably, one would select from a particular type such as: for example, from an epoxidized hydrocarbon or from the epoxidized natural oils (soy, tall, and linseed) or from the epoxidized glycidyl ethers of aromatic compounds or, more preferably, from a smaller and more limited group of these epoxidized aromatics one could select an epoxidized polyglycidyl ether of phenol. Some of the more preferred, particular embodiments are shown in the examples.

One group of polyfunctional epoxy crosslinkers that can be used with the instant invention are epoxidized hydrocarbyl compounds. Natural oils which are epoxidized are examples of these. These crosslinkers can be derived from substances such as tall oil (taken from wood chips); soy oil (from the soybean); and linseed oil (from flax plant seeds), by epoxidation. Preferred polyfunctional epoxy crosslinkers derived exclusively from natural oils, could thus be selected from the group consisting of: epoxidized linseed oil; epoxidized soy oil; and epoxidized tall oil.

Another naturally derived hydrocarbyl that can be epoxidized to obtain effective polyfunctional crosslinkers includes natural rubber.

Acceptable epoxy crosslinking agents are thus epoxidized soy oil, epoxidized linseed oil, epoxidized tall oil or epoxidized natural rubber. A word of caution is appropriate with regard particularily to the use of the more active crosslinkers. It can be noted that some crosslinkers are active at lower temperatures. In fact, crosslinking activity can be obtained from eoxidized natural rubber at temperatures between 130 and 135° C. Therefore, especially when utilizing active crosslinkers in order to obtain the instant compositions, the temperature maintained for the initial mixing of the three ingredients must be lower than 130° C. To obtain the instant compositions, a homogeneous blend must be prepared before crosslinking. Such highly active polyfunctional epoxy crosslinkers should be utilized with the initial blending temperature ranges that are preferred (from about 100° to about 130° C.) or, more preferably, from about 110° to about 125° C.

If the high blending temperatures are used with any crosslinkers, the epoxy must be added to a homogeneous blend of the XNBR and the copolymer (or ionomer) and this addition must be done in a manner which will obtain uniform crosslinking of the homogeneous blend. This is called for when any crosslinker addition is preformed at a temperature where active crosslinking will take place.

An acceptable epoxidized crosslinking agent can also be selected from the group consisting of: an epoxidized alkyl glycidyl ether, an epoxidized polyglycidyl ether of phenol, epoxidized glycidyl ethers of aromatic compounds, an epoxy cycloalkyl carboxylate, epoxidized glycidyl ethers of aliphatic polyols, epoxidized thioglycidyl resins, glycidyl esters, epoxidized polybutadienes, epoxidized unsaturated polyesters.

A preferred polyfunctional epoxy crosslinking agent can be selected from the group consisting of: 3,4-epoxycyclohexalmethyl(3,4-epoxy)cyclohexane carboxylate; polyphenolformaldehyde poly (2,3-epoxy propyl) ether; tetraglycidoxy tetraphenylethane 2,2-bis(4,(2-,3epoxypropopoxy)-3,5-dibromophenyl) propane and epoxidized diglycidyl ether of bisphenol A.

Of these, it can be noted that 3,4-epoxy-cyclohexalmethyl-(3,4-epoxy) cyclohexane carboxylate is an excellent crosslinker, having good crosslinking activity and a moderately fast reaction rate.

The carboxylated butadiene-acrylonitrile polymer should contain a minimum of 1% by weight of the carboxylated monomer. An acceptable range for the concentration of the carboxylated monomer is from about 1 to about 20% by weight. A preferred range is from about 2.5 to about 15% by weight of carboxylated monomer and the most preferred concentration range for the carboxylated monomer is from about 3 to about 10% by weight. The acrylonitrile monomer can acceptably be present in a range of from about 15 to about 50% by weight; preferably, it is present in a range of from about 18 to about 45% by weight, and more preferably in a concentration range of from about 20 to about 40% by weight. Carboxylated butadiene-acrylonitrile polymers are commercially available and can be purchased from such sources as Polysar, Goodyear, and Goodrich.

Ethylene/acrylate ionomers and ethylene acrylic acid copolymers are both commercially available. If desired, an ethylene/acrylate ionomer can be directly utilized or an ethylene/acrylate acid copolymer can be used and an appropriate amount of metal ion added by adding a metal salt. Suitably, the metal salt can be added by melt blending, either before or after the dynamic crosslinking. Even when using a commercially available ionomer, however, it is permissible to increase the concentration of the metal ion by adding a metal salt before or after dynamic crosslinking. Preferably, a metal oxide is used.

The acrylate moiety of the ionomer should be present in a minimum amount of about 1.0 parts Php. An acceptable range, therefore, for the acrylate moiety (including both neutralized and unneutralized acrylate) is from about 1.0 to about 50 parts Php. A preferred range is from about 5 to about 30 parts Php. and an even more preferred range is from about 10 to about 25 parts Php.

The neutralizing metal ion, as previously indicated, can be provided by the addition of a metal salt. Any metal salt can acceptably be used. Preferably, a metal oxide is used. Although generally the metal ion utilized can be any particular metal (of any metal salt) preferred metals are selected from Groups I and II of the Periodic Table. Other preferred metals are selected from zinc, sodium, calcium and magnesium, the oxides of these metals are most preferred.

From the discussion thus far, it can be appreciated that the process for the preparation of the instant invention has several embodiments. It is permissible to use ethylene/acrylic acid copolymer or ionomer in the blend with the XNBR, with the addition of the metal ion to provide to increase the ionic crosslinking. The metal ion, (in the form of a metal salt) can, furthermore be added either before or after dynamically crosslinking with the polyfunctional epoxy crosslinker.

It is also possible to vary the temperature at which the crosslinker is added. Furthermore, adding the crosslinker at temperatures which permit substantially no effective crosslinking activity allows the crosslinker to be mixed with either the XNBR or the ethylene/acrylic acid copolymer (or ionomer) before or after the addition of the other ingredient(s). These mixing temperatures are under 130° C., generally from 110° up to 130° C.

Preferred embodiments call for the homogeneous blending of (1) the XNBR, (2) the polyfunctional epoxy crosslinker and (3) the ionomer or the ethylene/acrylic acid copolymer at a temperature less than 135° C. only if permitted by using crosslinkers that are not active at these temperatures; and preferably at from about 110° to 130° C. for all crosslinkers but especially for active crosslinkers. In these embodiments, as in any procedure used to prepare the instant compositions, mixing of the ingredients must be done so that no crosslinking will occur until uniform crosslinking of the homogeneous mixture can occur. As previously indicated, this requires procedures such as mixing at a temperature where the polyepoxy will be relatively inactive, and/or adding and mixing slowly and in small amounts so that uniform crosslinking of a homogeneous mixture will produce the instant compositions.

In an alternative procedure, the epoxy crosslinker is added to the homogeneous blend of XNBR and copolymer at elevated temperatures. When this is done, if the manner of epoxy addition does not achieve uniform crosslinking, then the resulting product will be a blend of the corsslinked product with the non-crosslinked mixture. Reliable, reproduceable results, and desired characteristics will not be obtained since both the amount of crosslinking and the amount of the crosslinked material is not controlled.

The ingredients can be added in any convenient order. After the homogeneous blend is obtained, the temperature is increased (over 135° C.) to obtain dynamic crosslinking. Elevated temperatures are maintained until dynamic crosslinking has been completed. The temperature should be kept lower than 200° C. A preferred temperature range is from about 140° C. to about 185° C.

It is also important to keep in mind that the instant invention requires some ionic bonds, thus, either an ionomer is used, or the needed metal is added, preferably in the form of a metal oxide. Acceptably, when desired, a metal salt can be added at any convenient time either before or after dynamic crosslinking. When the metal ion is introduced afterward, the composition should be melt blended until a homogeneous composition is obtained. If, however, the metal ion is introduced after dynamic crosslinking, it has been discovered that the physical properties provided by the addition of the metal ion will not be fully realized unless a second dynamic crosslinking procedure is performed. Thus, preferably, when the metal ion is introduced after dynamic crosslinking, shear mixing under elevated temperatures, is performed to allow ionomer formation and obtain the desired characteristics.

While the composition can be prepared by the addition of the crosslinker to the blend at active crosslinking temperatures (usually in excess of 135° C. and preferably less than 200° C.) in a manner effective to product uniform crosslinking, it is preferred not to elevate the temperatures to crosslink until after a uniform dispersion of the crosslinker is obtained. This will avoid the danger of non-uniform crosslinking and inferior products which would result from crosslinking poorly mixed combination.

Suitable mixing apparatus includes mills, internal mixers, extruders, and other apparatus which are applicable in the rubber and plastics industry.

The level of covalent crosslinking is varied by increasing or decreasing the oxirane oxygen concentration and/or the level of the available carboxy functionalities in the resin. Because this dynamic (covalent) crosslinking is provided, the instant composition is capable of providing a higher temperature use range than an ionically crosslinked blend of the two polymers. The instant composition also provides superior flexibility, lower tensile set, and higher tear strength. The covalent crosslinking (possibly within the individual polymers as well as between the two polymers), in combination with the ionomer characteristics of the blend raises the use temperature and improves overall physical properties.

The characteristics of the instant thermoplastic elastomer can be controlled and varied by increasing or decreasing the concentration of the elastomer, the ionomer, the ionic bonding, and/or by increasing or decreasing the level of dynamic crosslinking. In addition to this, it is also within the scope of the instant invention to use plasticizers, pigments, fillers, stabilizers, and antioxidants in the thermoplastic elastomer. Such additives can be added at any time in the mixing sequence. Thus, they could be added to the mixture and homogeneously mixed in at any point before or after dynamic crosslinking, or the finished product can even be reheated and the additives blended in.

Non-reactive (cannot be crosslinked) polymers, for example, can be selected and used as modifiers, fillers, carriers for pigments and as plasticizers. As previously indicated, these can be added at any point, although preferably they are added and uniformly blended into the product after crosslinking. Thermoplastic resins which are especially useful as modifiers include polymers and copolymers of monomers selected from ethylene, propylene, other olefins, mixturs of olefins, vinyl chloride, styrene, butadiene, vinyl acetate and acrylate esters. The polymer and copolymers also can optionally be halogenated, sulfonated, and halosulfonated. Preferred modifiers can be selected from: polyethyleneacrylic acid esters, polyethylene ethylacetate, polyethylene vinyl acetate, polystyrene/butadiene, polystyrene/butadiene/styrene, polycaprolactone, polyvinylchloride, and polyvinylchloridevinyl acetate.

The instant invention can also be readily understood from the examples that follow. It should be understood, however, that these examples are offered to illustrate the instant invention, and not to limit it.

The following examples include data collected from ASTM tests performed on the finished dynamically crosslinked product. Test samples were prepared, and individual specimens for the tests were cut from the sample. The test samples were prepared by compression molding in a 6 in ×6 in ×0.075 in mold at 175° C. (unless otherwise indicated) using a molding cycle of a two minute warm up without pressure, two minutes under 800 psi and a cool down to 65° C. under pressure before removing from mold. The tests performed and their ASTM number are:

Hardness, Shore "A" ASTM D2240
Tensile Strength, Modulus ASTM D412 and Elongation Method A
Immersion, Vol. change in oil. ASTM D471
Compression set ASTM D39 Method B
Melt Index ASTM D1238

The tear resistance, Brown initial strength measurement in lbs. was taken in accordance with the following procedure: condition test speciment for 24 hours at 23±1° C. and 50±2% RH (relative humidity). Three 4 in. ×2 in. u-shaped test specimens were cut from the test sample. The following procedure was used: (a) Mount test specimens in Instron Tensile Tester by clamping the two legs of the specimen in the jaws of the Instron Tester, (b) Set jaw separation at 1 in. and Instron gauge at 0, then pull jaws apart at a constant speed of 12 in./min, (c) Record initial tear strength in lbs. Test value is the average obtained from three specimens of the same sample.

EXAMPLE 1

Sample blends 1-5 were prepared by mixing the carboxylated butadiene-acrylonitrile elastomer (Krynac ® 211) at temperatures within 120°-130° C. with the sodiumethylene/acrylic acid ionomer (Surlyn ® 8920). The epoxy crosslinker was added, homogeneously mixed, the temperature was thereafter increased to 155° C., and the mix was melt blended for five minutes (for the dynamic crosslinking). The crosslinking agent used was the epoxy hydrocarbyl crosslinking agent Paraplex G-62, an epoxidized soy oil (approximately 6.8% by wt. oxirane oxygen).

When no epoxy crosslinker was added, the temperature was increased to 155° C. after the initial mixing of the two polymers, and the blend was mixed five more minutes, allowing interaction between the free carboxyl units of the carboxylated nitrile polymer and the metal ion of the ionomer. Such a procedure produces a mixed ionomer of the two polymers.

Similar blends of the copolymers are compared in the following table both with and without the epoxy crosslinker. This series shows that dynamic crosslinking can be induced with the instant epoxidized crosslinkers to produce thermoplastic elastomers over a wide range of polymer ratios.

TABLE I

| Sample No. & Ingredients | Parts By Weight | 50% Modulus PSI | Tensile PSI | Elong. % | Hardness Shore A | Brown Tear Initial Lbs. |
|---|---|---|---|---|---|---|
| 1 Krynac 211 | 90 | | | | | |
| Surlyn-Na | 10 | 135 | 670 | 750 | 55 | — |
| WITH 2 PARTS | | | | | | |
| Epoxy | | 210 | 860 | 375 | 59 | 37 |
| 2 Krynac 211 | 75 | | | | | |
| Surlyn-Na | 25 | 375 | 770 | 580 | 75 | 38 |
| WITH 2 PARTS | | | | | | |
| Epoxy | | 450 | 1250 | 340 | 80 | 54 |
| 3 Krynac 211 | 50 | | | | | |
| Surlyn-Na | 50 | 970 | 2060 | 395 | 93 | 67 |
| WITH 2 PARTS | | | | | | |
| Epoxy | | 1120 | 2310 | 265 | 94 | 91 |
| 4 Krynac 211 | 25 | | | | | |
| Surlyn-Na | 75 | 1800 | 3410 | 315 | 96 | 82 |
| WITH 2 PARTS | | | | | | |
| Epoxy | | 2100 | 3450 | 205 | 97 | — |
| 5 Krynac 211 | 10 | | | | | |
| Surlyn-Na | 90 | 2270 | 3710 | 265 | 98 | 83 |
| WITH 2 PARTS | | | | | | |
| Epoxy | | 2500 | 3590 | 155 | 97 | — |

In the above example, it should be noted that the materials which were prepared with no epoxy (having only ionic crosslinking and no covalent crosslinking), could only be removed from the mill in a whole sheet by first cooling the mill to temperatures between 100°–110° C. The blends, which were covalently crosslinked with epoxy crosslinker, however, were easily removed from the mill as a single sheet without cooling, thus demonstrating its good processing characteristics at temperatures of 150–155° C.

EXAMPLE 2

Sample blends 6-10 were prepared according to the following general procedure. The carboxylated butadiene-acrylonitrile elastomer (XNBR) used herein, containing approximately 9% carboxylated monomer, and approximately 25–29% acrylonitrile monomer (Krynac 211 marketed by Polysar, Inc.) was blended in the amount indicated below for each sample along iwth the specified amount of Surlyn ® 8920 (copolymer fo ethylene/acrylic acid with sodium). The blends were made by blending the two polymers on a laboratory mill at 150°–155° C. After the intial blending, milling was continued at this temperature for five minutes to induce any interaction between the free carboxylated units of the carboyxlated nitrile polymer and the metal ion of the ionomer. Such a blending procedure produces a "mixed" ionomer of the two polymers. Milling characteristics of this "mixed" ionomer were such that the temperature of the mixing mill had to be reduced to 100°–110° C. before the composition could be removed from the mill as a single sheet. For samples 7-10, the epoxy hydrocarbyl crosslinking agent, Paraplex ® G-62 epoxidized soy oil was added to the blend after the initial blending of the two polymers, and milling was continued at 150°–155° C. temperature for five more minutes to produce the dynamically crosslinked product. During the procedure, crosslinking activity was apparnet after two to three minutes of milling. As the dynamic crosslinking takes place, the mix shows greater cohesion, less mill tack, higher viscosity, and increased elasticity. At the more desirable levels of crosslinking (less than five parts) a smoother milled sheet having more uniform flow and better processing is produced. The crosslinked blends were easily removed from the 150°–155° C. mill as a single sheet without the cooling which is required when no dynamic crosslinking is present.

TABLE II

| Sample No. & Ingredients | Parts By Weight | 50% Modulus PSI | Tensile PSI | Elong. % | Hardness Shore A | Brown Tear Initial Lbs. |
|---|---|---|---|---|---|---|
| 6 Krynac | 60 | | | | | |
| Surlyn | 40 | | | | | |
| Epoxy | 0 | 670 | 1880 | 445 | 86 | 59 |
| 7 Krynac | 60 | | | | | |
| Surlyn | 40 | | | | | |
| Epoxy | 1 | 810 | 2150 | 400 | 88 | 87 |
| 8 Krynac | 60 | | | | | |
| Surlyn | 40 | | | | | |
| Epoxy | 2 | 930 | 2440 | 335 | 87 | 89 |
| 9 Krynac | 60 | | | | | |
| Surlyn-Na | 40 | | | | | |

TABLE II-continued

| Sample No. & Ingredients | Parts By Weight | 50% Modulus PSI | Tensile PSI | Elong. % | Hardness Shore A | Brown Tear Initial Lbs. |
| --- | --- | --- | --- | --- | --- | --- |
| Epoxy | 3 | 935 | 2350 | 275 | 89 | 92 |
| 10 Krynac | 60 | | | | | |
| Surlyn | 40 | | | | | |
| Epoxy | 5 | 900 | 2200 | 215 | 90 | 67 |

EXAMPLE 3

An ethylene-acrylic acid copolymer (et/ac copolymer) was used (Primacor 435 manufactured by Dow Chemical), having an acrylic acid monomer content of approximately three percent. The elastomer used was the same as is described in Example 2 (Krynac 211). The ethylene/acrylic acid copolymer, and the zinc oxide were added and mixed in the amounts shown in the table below at a temperature of 120°-130° C. The epoxy crosslinker (the epoxidized soy oil—Paraplex G-62 having about 6.8% oxirane content) was added in the amounts indicated below after which time the temperature was increased to 155° C. The mixture was blended for five minutes while crosslinking occurred to complete the thermoplastic elastomer.

TABLE III

| Sample 11 | |
| --- | --- |
| XNBR | 60 |
| Et/Ac Copolymer | 40 |
| Epoxy | 2 |
| ZnO | 5 |
| 50% Modulus, psi | 30 |
| Tensile, psi | 1,650 |
| Elongation, % | 365 |
| Hardness, Shore A | 91 |
| Brown Tear, lbs. | 66 |
| Milled Sheet | Smooth |

EXAMPLE 4

Sample blends 12–15 were prepared according to the procedure explained in Example 2. The same carboxylated butadine-acrylonitrile elastomer (Krynac 211) was used; the other compolymer was a copolymeric ethylene zinc acrylate ionomer (Surlyn 9020) in the amounts shown in the table below. Epoxidized soy oil was used as the crosslinking agent (Paraplex G-62).

TABLE IV

| Sample No. & Ingredients | Parts By Weight | 50% Modulus PSI | Tensile PSI | Elong. % | Hardness Shore A | Brown Tear Initial Lbs. |
| --- | --- | --- | --- | --- | --- | --- |
| 12 XNBR | 60 | | | | | |
| Ionomer | | | | | | |
| Epoxy | | | | | | |
| Epoxy | 0 | 350 | 1030 | 685 | 79 | 41 |
| 13 XNBR | 60 | | | | | |
| Ionomer | 40 | | | | | |
| Epoxy | 1 | 410 | 1640 | 655 | 79 | 48 |
| 14 XNBR | 60 | | | | | |
| Ionomer | 40 | | | | | |
| Epoxy | 2 | 410 | 1470 | 440 | 78 | 50 |
| 15 XNBR | 60 | | | | | |
| Ionomer | 40 | | | | | |
| Epoxy | 3 | 435 | 1560 | 340 | 79 | 52 |

For the above described mixture excellent processing characteristics and good physical properties are shown at epoxy levels between 1 and 2.0 PhP (preferred 1.5–2.0 PhP).

EXAMPLE 5

(Comparative)

This is a comparative example wherein the same crosslinker used in Example 1 (Paraplex G-62) was blended in varying amounts with the same (XNBR) used in Examples 1–4. These two ingredients were blended on a laboratory mill at 150°–155° C. and compression molded at 175° C. with cool down under pressure.

During the milling operation, it was obvious that the XNBR was crosslinked. This composition is undesireable; good physical properties do not develop. When the crosslinking concentration is high enough to increase tensile strength, the milled sheet itself becomes rough, full of holes, and crumbly. The followtable shows Samples 16–18 which were prepared with similar amounts of the same crosslinker used in the previous Examples. The blends of the table below thus only had covalent crosslinking.

TABLE V

| Sample | Parts By Weight | 50% Modulus PSI | Tensile PSI | Elong. % | Hardness Shore A |
| --- | --- | --- | --- | --- | --- |
| 16 XNBR | 100 | | | | |
| Epoxy | 1 | 92 | 400 | 495 | 49 |
| 17 XNBR | 100 | | | | |
| PAR-62 | 2 | 92 | 500 | 440 | 49 |
| 18 XNBR | 100 | Milled sheet was rough and lumpy, full | | | |
| PAR-62 | 3 | of holes and did not flow in the mold | | | |
| | | well enouh to form a good sample. | | | |

COMPARATIVE

Example 6

The following sample blends 19–24 were prepared with both the sodium ionomer, Surlyn 8920, and the zinc ionomer, Surlyn 9020, both of which are previously described. The epoxy crosslinker used was Paraplex G-62 (epoxidized soy oil) also used in previous examples. Test samples 19–24 were prepared by milling at 150°–155° C. Test specimens were compression molded at 175° C. with cool down under pressure. Table VI shows the results for testing done on these samples.

TABLE VI

| Sample | Parts By Weight | 50% Modulus PSI | Tensile PSI | Elong. % | Hardness Shore A | Melt Index* |
|---|---|---|---|---|---|---|
| 19 Surlyn 8920 | 100 | 2475 | 4470 | 275 | 97 | 48.7 |
| 20 Surlyn 8920 | 100 | | | | | |
| Epoxy | 1 | 2560 | 4340 | 230 | 95 | 1.1 |
| 21 Surlyn 8922 | 100 | | | | | |
| Epoxy | 2 | 2660 | 3290 | 110 | 95 | — |
| 22 Surlyn 9020 | 100 | 1240 | 2730 | 340 | 94 | — |
| 23 Surlyn | | | | | | |
| Epoxy | 0.5 | 1530 | 2670 | 215 | 95 | — |
| 24 Surlyn 9020 | 100 | | | | | |
| Epoxy | 1.0 | 1540 | 2750 | 200 | 94 | — |

*Melt Index =g/10 min. @ 375° F. and 433 PSI (ASTM D1238).

Although acceptable physical characteristics were obtained with Samples 20, 21, 23, and 24, it was very difficult to get satisfactory molding. The materials had very poor flow characteristics.

The samples above show both the sodium ionomer, Surlyn 8920, and the zinc ionomer, Surlyn 9020, alone using the same epoxy crosslinker as was used in Example 2. Both polymers show rapid increases in viscosity on the mixing mill at very low levels of addition of the crosslinker; as low as one part for the sodium and as low as 0.5 for the zinc; with the zinc showing a more rapid viscosity increase than the sodium. At the higher levels of crosslinker the viscosity increased to a point where the polymer could no longer be effectively processed, as indicated by the low melt index. Such compositions could not be satisfactorily extruded or injection molded.

Unlike the individual polymers, blends of a carboxylated butadiene-acrylonitrile elastomer and a metal-ion neutralized ethylene-crylic acid copolymer can be dynamically crosslinked with the polyfunctional epoxy compounds to produce a thermoplastic elastomer having good physical properties and excellent processing characteristics.

EXAMPLE 7

In this Example, the XNBR elastomer used was Krynac 231 marketed by Polysar, Ltd. which had approximately 7% carboxylated monomer and a level of acrylonytrile monomer in the range of 30-33%. This XNBR is shown in Sample 25. Another XNBR which was evaluated was NX 775 by Goodyear which also contained approximately 7% carboxylated monomer (Sample 29), but had an acrylo-nytrile monomer content of about 28%). The ionomer was Surlyn 8920 (previously described).

These blends were prepared in accordance with the procedures given for Example 2, also using the same crosslinker (epoxidized soy oil Paraplex G-62).

TABLE VII

| Sample & Material | Parts By Weight | 50% Modulus PSI | Tensile At Break-PSI | Elong. % | Hardness Shore A | Brown Tear Initial Lbs. |
|---|---|---|---|---|---|---|
| 25 Krynac 231 | 60 | | | | | |
| Surlyn 8920 | 40 | 530 | 1190 | 485 | 86 | 52 |
| With Epoxy | 2 | 920 | 1890 | 325 | 89 | 75 |
| 26 NX 775 | 60 | | | | | |
| Surlyn 8920 | 40 | 570 | 685 | 299 | 87 | 36 |
| With Epoxy | 2 | 740 | 2100 | 340 | 89 | 76 |

EXAMPLE 8

This example shows that filters, antioxidants and processing aids can be added to the dynamically crosslinked blend for purposes such as improving processing, increasing stiffness and hardness or lowering costs. The XNBR used was Krynac 211 (described previously). The ionomer used was Surlyn 8920 ionomer previously described, the epoxy crosslinking agent used was epoxidized soy oil (Paraplex G-62). All of these were used in the amounts indicated in the table below. The sample below was prepared in accordance with the following procedure. The XNBR copolymer and the Surlyn 8920 ionomer were melt blended on a laboratory mill at 150°–155° C. After the initial blending, the FEF (Fast Extrusion Furnace) Black as a pigment and filler, Carbowax-4000 (a polyethylene glycol with a molecular weight of about 4000) as a plasticizer and Agerite Superlite (di-B-napthyl-P-phenylene-diamine) an antioxidant were added, followed by the Paraplex G-62 (epoxy). After the addition of all materials, milling was continued for five minutes at the 150°–155° C. mill temperature until the dynamic crosslinking had been completed. The table below shows the amounts of each ingredient and the results of tests conducted on this sample.

TABLE VIII

| Sample & Material | Parts By Weight | 50% Modulus PSI | Tensile At Break-PSI | Elong. % | Hardness Shore A | Brown Tear Initial Lbs. |
|---|---|---|---|---|---|---|
| 27 XNBR | 60 | | | | | |
| Ionomer | 40 | | | | | |
| Epoxy | 2 | | | | | |
| Agerite Superlite | 1 | | | | | |
| Carbowax | 2 | | | | | |

TABLE VIII-continued

| Sample & Material | Parts By Weight | 50% Modulus PSI | Tensile At Break-PSI | Elong. % | Hardness Shore A | Brown Tear Initial Lbs. |
|---|---|---|---|---|---|---|
| FEF Black | 15 | 1390 | 2220 | 175 | 94 | 85 |

EXAMPLE 9

This example demonstrates a preferred method for the preparation of the instant thermoplastic elastomer. The method applied in this example results in dynamically crosslinked thermoplastic elastomers which have more uniform physical and processing characteristics.

Accordingly, the samples of the table below were prepared by blending the epoxidized natural rubber (ENR-50) crosslinking agent (designated by "epoxy" in the table below) on a cold laboratory mixing mill with the XNBR. The blend was then melt blended with the ionomer at 120° C. After the mixture was blended uniformly, the temperature was raised to 147°-156° C. and milling continued for five minutes, to induce more rapid crosslinking. The thermoplastic elastomer produced was easily processed on conventional thermoplastic processing equipment. The table below gives the test results of the samples prepared according to the above procedure. The addition of zinc oxide to increase the overall ion content of the composition shows only a slight increase in modulus and reduction in elongation. Variations in tensile strength and hardness appear to be within experimental error.

TABLE IX

| Sample & Material | Parts By Weight | 50% Modulus PSI | Tensile At Break-PSI | long. % | Hardness Shore A |
|---|---|---|---|---|---|
| 28 Krynac 211 | 55 | | | | |
| Surlyn 8920 | 35 | | | | |
| Epoxy | 10 | 704 | 2325 | 352 | 88 |
| 29 Krynac 211 | 55 | | | | |
| Surlyn 8920 | 35 | | | | |
| Epoxy | 10 | | | | |
| ZnO | 5 | 812 | 2259 | 320 | 87 |
| 30 Krynac 211 | 50 | | | | |
| Surlyn 8920 | 35 | | | | |
| Epoxy | 15 | 870 | 2003 | 198 | 88 |
| 31 Krynac 211 | 50 | | | | |
| Surlyn 8920 | 35 | | | | |
| Epoxy | 15 | | | | |
| ZnO | 5 | 906 | 2484 | 273 | 90 |
| 32 Krynac 211 | 45 | | | | |
| Surlyn 8920 | 35 | | | | |
| Epoxy | 20 | 812 | 2492 | 307 | 90 |
| 33 Krynac 211 | 45 | | | | |
| Surlyn 8920 | 35 | | | | |
| Epoxy | 20 | | | | |
| ZnO | 5 | 874 | 2413 | 290 | 90 |
| 34 Krynac 211 | 60 | | | | |
| Surlyn 9020 | 40 | | | | |
| Epoxy | 3 | | | | |
| ZnO | 5 | 550 | 1384 | 483 | 82 |
| 35 Krynac 211 | 60 | | | | |
| Surlyn 9020 | 40 | | | | |
| Epoxy | 5 | | | | |
| ZnO | 5 | 555 | 1460 | 446 | 82 |

Krynac, 211 was the carboxylated butadieneacrylonitrile elastomer (XNBR of Example 2) (9% carboxylated monomer and approximately 25-29 percent arylonitrile monomer). Surlyn 8920 was the sodium ionomer of a ethylene-acrylic acid copolymer (of Example 2) and surlyn 9020, was the zinc ionomer. The epoxy, an epoxidized natural rubber (ENR-50) contained approximately 50 mole percent epoxidation of the double bonds. The epoxidation has been shown to be random.

EXAMPLE 10

The compositions were mixed in the same manner as samples 7-10 of Example 2 except that the three polymers were melt blended together before the addition of the Paraplex G-62 epoxy crosslinker. After the addition of the Paraplex G-62, milling was continued at the 150°-155° C. mixing temperature for five minutes to complete dynamic crosslinking.

Elvax ® 360, an ethylene-vinyl acetate copolymer, (containing approximately 25 percent vinyl acetate) was added as a solid plasticizer or modifier and which effectively reduced modulus and hardness without severly limiting tensile strength elongation and tear strength. Elvax 360 (a non-reactive thermoplastic resin) does not dynamically crosslink or enter into the ionic structure of the thermoplastic elastomer.

TABLE X

| Sample 36 | | | |
|---|---|---|---|
| Krynac 211 | 60 | 60 | 50 |
| Surlyn 8920 | 30 | 25 | 35 |
| Elvax 360 | 10 | 15 | 15 |
| Paraplex G-62 | 3 | 3 | 2.5 |
| 50 Modulus, PSI | 610 | 515 | 745 |
| Tensile, PSI | 1,780 | 1,500 | 2,080 |
| Elongation, % | 280 | 280 | 330 |
| Hardness, Shore A | 83 | 80 | 87 |
| Brown Tear, Initial, lbs. | 47 | 52 | 60 |

EXAMPLE 11

In this example, the elastomer, Keynac 211 and the ionomer, Surlyn 8920, were homogeneously blended in the amounts indicated in the table below at a temperature of 120°-130° C. The epoxy crosslinker used was added during mixing and the temperature was then increased to 155° C., and the mixture was blended for 5 more minutes while crosslinking occurred to complete the thermoplastic elastomer.

This example shows that this invention is not limited to the crosslinking activity of any one particular polyfunctional epoxy, and demonstrates that any miscable polyfunctional epoxy compound could be used as the dynamic crosslinker. Concentrations required to produce the desired processing characerictics and physical properties of the resulting thermoplastic elastomer will depend on the molecular structure and the overall oxirane content. Preferably, the oxirane content of the polyfunctional epoxy crosslinker is between five and 15 percent by wt. The following epoxy compounds were evaluated.

| Code | Trade Name | Chemical Name | Manufacturer |
|---|---|---|---|
| A. | Drapex 10.4 | Epoxidized Linseed Oil | (Argus) |

-continued

| Code | Trade Name | Chemical Name | Manufacturer |
|------|------------|---------------|--------------|
| B. | Drapex 4.4 | 4,4'-octyl epoxy tallate | (Argus) |
| C. | Epon 828 | Diglycidyl ether of bisphenol A | (Shell) |
| D. | Araldite EPN 1138 | Polyglycidyl ether of phenol-formaldehyde novolac | (Ciba-Geigy) |
| E. | Araldite CY 179 | 3,4-Epoxycyclohexyl-methyl-(3,4-epoxy)cyclohexane carboxylate | (Ciba-Geigy) |
| F. | Epon 1031 | Tetraglycidoxy tetraphenylethane | (Shell) |
| G. | EPI Rex 5163 | Diglycidyl ether of tetra-bromo bisphenol A | (Celanese) |
| H. | Araldite RD1 | n-butyl glycidyl ether (A mono epoxy for a comparison.) | (Ciba-Geigy) |

TABLE XI

| Sample No. & Ingredients | Parts By Weight | 50% Modulus PSI | Tensile PSI | Elong. % | Hardness Shore A | Brown Tear Initial Lbs. |
|---|---|---|---|---|---|---|
| 37 Krynac 211 | 60 | | | | | |
| Surlyn 8920 | 40 | 670 | 1880 | 445 | 86 | 59 |
| 38 With Epoxy A | 2 | 900 | 2360 | 300 | 89 | 89 |
| 39 Epoxy B | 2 | 600 | 1630 | 300 | 87 | 63 |
| 40 Epoxy C | 2 | 915 | 2160 | 290 | 90 | 66 |
| 41 Epoxy C | 5 | 1220 | 2410 | 200 | 90 | 70 |
| 42 Epoxy D | 2 | 780 | 1700 | 235 | 89 | 57 |
| 43 Epoxy F | 2 | 740 | 1780 | 265 | 88 | 44 |
| 44 Epoxy F | 4 | 870 | 1970 | 195 | 90 | 49 |
| 45 Epoxy G | 2 | 700 | 1320 | 250 | 90 | 43 |
| 46 Epoxy G | 4 | 840 | 1420 | 185 | 90 | 50 |
| 47 Epoxy H | 2 | 575 | 1230 | 380 | 85 | 37 |

Crosslinking is indicated by the increase in modulus, hardness and tear strength and a reduction in elongation. Preferred crosslinkers would also increase tensile. Epoxy H, n-butyl glycidyl ether, a monofunctional epoxy molecule does not affect crosslinking. Instead, it has a plasticizing effect and reduces modulus, tensile, elongation, hardness and tear strength.

EXAMPLE 12

In this example, the elastomer, Keynac 211 and the ionomer, Surlyn 8920, were homogeneously blended in the amounts indicated in the table below at a temperature of 120°-130° C. The epoxy crosslinker used was Araldite Cy179 (Ciba-Geigy) 3,4-epoxycyclohexalmethyl(3,4-epoxy)cyclohexane carboxylate, Epoxy E of Example 11 and was added during mixing and the temperature was then increased to 155° C., and the mixture was blended for five more minutes while crosslinking occurred to complete the thermoplastic elastomer.

This example shows another polyfunctional epoxy crosslinker, and demonstrates the use of this crosslinker at different concentrations. This particular crosslinker gives particularly desireable characteristics at concentrations of from about 0.25 to about 2 parts per hundred parts of polymer.

| | a | b | c | d | e | f |
|---|---|---|---|---|---|---|
| Krynac 211 | 60 | 60 | 60 | 60 | 60 | 60 |
| Surlyn 8920 | 40 | 40 | 40 | 40 | 40 | 40 |
| Araldite CY179 | 0 | 0.1 | 0.25 | 0.5 | 1.0 | 2 |
| 50% Modulus | 630 | 620 | 680 | 690 | 750 | 800 |
| Tensile | 1730 | 1670 | 1960 | 2120 | 2340 | 1960 |
| Elongation | 570 | 500 | 500 | 470 | 440 | 285 |
| Hardness | 87 | 87 | 88 | 89 | 90 | 90 |
| Brown Tear | 59 | 60 | 65 | 69 | 84 | 70 |

EXAMPLE 13

The ethylene acrylic acid copolymer (Primacor 3150), the XNBR (Krynac), and the zinc oxide when used were mixed at a temperature of about 153° C. After a homogeneous mixture had been obtained, the epoxidized soy oil crosslinker (Paraplex G-62) was added in the cases of Samples d, e and f while milling was continued at the same temperature in order to allow crosslinking. Approximately five minutes was allowed for crosslinking. The samples were tested and the results are given below.

The data below shows that ionic and covalent bonds are both necessary to produce good characteristics in the desired thermoplastic elastomer.

| | a | b | c | d | e | f |
|---|---|---|---|---|---|---|
| Krynac 211 (XN BR) | 60 | 60 | 60 | 60 | 60 | 60 |
| Primacor 3150 (Ethylene Acrylic Acid Copolymer) | 40 | 40 | 40 | 40 | 40 | 40 |
| Zinc Oxide | — | 5 | 10 | — | 5 | 10 |
| Paraplex G-62 (Epoxidized Soy Oil) | — | — | — | 2 | 2 | 2 |
| 50% Modulus, PSI | 360 | 410 | 420 | 420 | 500 | 670 |
| Tensile, PSI | 360 | 400 | 350 | 490 | 880 | 1560 |
| Elongation, % | 60 | 130 | 190 | 250 | 370 | 370 |
| Hardness, Shore A | 87 | 82 | 84 | 87 | 84 | 88 |
| Brown Tear, Initial, lbs. | 17 | 21 | 20 | 20 | 27 | 47 |

EXAMPLE 14

This example shows the combination of an additional amount of metal for the ionomer. In this case, the ionomer was Surlyn 8920 (copolymer of ethylene/acrylic acid with sodium) and zinc oxide was added to provide an additional amount of a different type of metal.

Samples b and c show the effects of the use of two distinct particulate fillers.

Using the procedure generally described in Example 13, the XNBR (Krynac 211), the ionomer of ethylene and acrylic copolymer (Surlyn 8920) and the zinc oxide were blended in a mill at temperatures between 152.9° and 155.6° C. After a homogeneous blend was obtained, the epoxidized soy oil crosslinker (Paraplex G-62) was added, blending continued in the mill for five minutes to allow crosslinking. After crosslinking the filler rice hulls (ground) and cork dust was added and milling continued in order to obtain an homogeneous blend. The samples were tested and the results are given below:

|  | a | b | c |
|---|---|---|---|
| Krynac 211 | 60 | 60 | 60 |
| Surlyn 8920 | 40 | 40 | 40 |
| Actox 16 (ZnO) | 5 | 5 | 5 |
| Paraplex G-62 | 2 | 2 | 2 |
| Rice Hulls | — | 20 | — |
| Cork Dust (40/dust) | — | — | 20 |
| 50% Modulus, PSI | 980 | 1060 | 1200 |
| Tensile, PSI | 2090 | 1570 | 1450 |
| Elongation, % | 265 | 180 | 120 |
| Hardness, Shore A | 91 | 96 | 93 |
| Brown Tear, Initial, lbs. | 74 | 40 | 65 |

EXAMPLE 15

Three different copolymers of ethylene vinyl acetate were used to modify the instant thermoplastic elastomer product. The copolymer of ethylene/acrylic acid used was an ionomer of sodium (Surlyn 8277) which had a low modulus.

By generally using the procedure of Example 2, a homogeneous blend of the elastomer, the ionomer and the thermoplastic modifier was prepared by milling these three ingredients at the temperature range of 153°–155° C.

The crosslinker was then added carefully for homogeneous crosslinking. After the crosslinker was added, milling continued at the temperature of 153°–155° C. to insure a complete crosslinking.

|  | a | b | c |
|---|---|---|---|
| Krynacc 211 | 65 | 65 | 65 |
| Surlyn 8277 | 25 | 25 | 25 |
| Elvax 150 (EVA) | 10 | — | — |
| Elvax 450 (EVA) | — | 10 | — |
| Elvax 750 (EVA) | — | — | 10 |
| Paraplex G-62 | 2.5 | 2.5 | 2.5 |
| 50% Modulus, PSI | 300 | 295 | 330 |
| Tensile, PSI | 1575 | 1375 | 1810 |
| Elongation, % | 480 | 460 | 460 |
| Hardness, Shore A | 69 | 71 | 74 |
| Brown Tear, Initial, lbs. | 40 | 40 | 47 |

EXAMPLE 16

This example illustrates the use of chlorosulfonated polyethylene (Hypalon 45 by Dupont) as a modifier. The dynamically crosslinked modified composition is compared with a blend of the polymers which is not crosslinked at all.

As in Example 15, and generally using the procedure of Example 2, a homogeneous blend of the elastomer, the ionomer and the thermoplastic modifier was prepared by milling these three ingredients at the temperature range of 153°–155° C.

The crosslinker was then added carefully for homogeneous crosslinking. After the crosslinker was added, milling continued at the temperature of 153°–155° C. to insure a complete crosslinking.

|  | a | b |
|---|---|---|
| Krynacc 211 | 62 | 62 |
| Surlyn 8920 | 30 | 30 |
| Hypalon 45 | 8 | 8 |
| Paraplex G-62 | — | 2 |
| 50% Modulus, PSI | 450 | 545 |
| Tensile, PSI | 1510 | 1760 |
| Elongation, % | 570 | 330 |
| Hardness, Shore A | 80 | 82 |
| Brown Tear, Initial, lbs. | 56 | 61 |

What is claimed is:

1. A thermoplastic elastomer comprising a blend of (a) a carboxylated butadiene-acrylonitrile elastomer and (b) a copolymer prepared from ethylene and a carboxylic acid monomer having a formula:

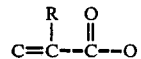

wherein R can be a hydrogen or a methyl group, and (c) a non-reactive thermoplastic resin; wherein the copolymer of (b) is at least partially neutralized with metal ions and wherein (a) and (b) were dynamically crosslinked with a polyfunctional epoxy crosslinking agent.

2. A composition as described in claim 1 wherein the metal ion is present in a minimum amount of 0.5 parts per hundred parts of total polymers.

3. A composition as described in claim 2 wherein the metal ion is selected from the metals of Group I and II of the Periodic Table.

4. A composition as described in claim 1 wherein (a) the carboxylated butadiene-acrylonitrile elastomer is present in an amount in the range of from about 10 to about 90 parts per hundred parts of total polymers and the copolymer of (b) is present in amount in the range of from about 90 to about 10 parts per hundred parts of total polymers.

5. A composition as described in claim 1 wherein the epoxy crosslinking agent is present in an amount sufficient to provide a minimum of 0.01 parts of oxirane oxygen per hundred parts of total polymers.

6. A composition as described in claim 1 wherein the polyfunctional epoxy crosslinking agent is a polyfunctional epoxy of an aromatic compound.

7. A composition as described in claim 1 wherein the elastomer (a) has a carboxylated monomer concentration in the range of from about 1 to about 20% by weight of the elastomer.

8. A composition as described in claim 1 wherein the polyfunctional epoxy crosslinking agent is a hydrocarbon compound which can be linear, branched and cyclic, which has from 4 to 28 carbon atoms, and which can contain ester and ether moieties.

9. A composition as described in claim 1 wherein the polyfunctional epoxy crosslinking agent is an epoxidized natural oil.

10. A composition as described in claim 6 wherein the polyfunctional epoxy of the aromatic compound is an epoxidized glycidyl, ether.

11. A composition as described in claim 1 which also contains a pigment and a plasticizer.

12. A composition as described in claim 1 which also contains an antioxidant, a pigment, a filler, and a plasticizer.

13. A composition as described in claim 1 wherein the thermoplastic resin is ethylene vinyl acetate.

14. A composition as described in claim 1 wherein the thermoplastic resin is a chlorosulfonated ppolyethylene.

15. A composition as described in claim 14 wherein the metal ion is present in a minimum amount of 0.5 parts per hundred parts of total polymers.

16. A composition as described in claim 14 wherein the metal ion is selected from the metals of Group I and II of the Periodic Table.

17. A composition as described in claim 14 wherein (a) the carboxylated butadiene-acrylonitrile elastomer is present in an amount in the range of from about 10 to about 90 parts per hundred of total polymers and the copolymer of (b) is present in amount in the range of from about 90 to about 10 parts per hundred of total polymers.

18. A composition as described in claim 14 wherein the epoxy crosslinking agent is present in an amount sufficient to provide a minimum of 0.01 parts of oxirane oxygen per hundred parts of total polymers.

19. A composition as described in claim 14 wherein the polyfunctional epoxy crosslinking agent is a polyfunctional epoxy of an aromatic compound.

20. A composition as described in claim 14 wherein the elastomer (a) has a carboxylated monomer concentration in the range of from about 1 to about 20% by weight of the elastomer.

21. A composition as described in claim 14 wherein the polyfunctional epoxy crosslinking agent is a hydrocarbon compound which can be linear, branched and cyclic, which has from 4 to 28 carbon atoms, and which can contain ester and ether moieties.

22. A composition as described in claim 14 wherein the polyfunctional epoxy crosslinking agent is an epoxidized natural oil.

23. A composition as described in claim 22 wherein the elastomer (a) is present in an amount of from about 90 to about 10 parts per hundred of total polymers; and wherein the copolymer of (b) is present in an amount of from about 10 to about 90 parts per hundred of total polymers.

24. A composition as described in claim 22 wherein the metal ions are present in a minimum amount of 0.5 parts per hundred parts of total polymers.

25. A composition as described in claim 22 which also contains a filler, a pigment, and a plasticizer.

26. A composition as described in claim 22 wherein the epoxy crosslinking agent is present in an amount sufficient to provide a minimum of 0.01 parts of oxirane oxygen per hundred parts of total polymers.

27. A composition as described in claim 22 wherein the elastomer has a carboxylated monomer concentration in the range of from about 1 to about 20% by weight of the elastomer.

* * * * *

UNITED STATES PATENT AND TRADEMARK OFFICE
CERTIFICATE OF CORRECTION

PATENT NO.   :   4,829,124

DATED        :   May 9, 1989

INVENTOR(S)  :   Lawrence Clark

It is certified that error appears in the above-identified patent and that said Letters Patent is hereby corrected as shown below:

In the Specification, in column 8, line 36, the number "D39" should read --D395--. In column 11, Table II, last line, under heading "50% Modulus PSI", the number "900" should read --920--. In column 11, Table IV, second line, under heading "Parts By Weight," insert the number --40--. In column 11, Table IV, seventh line, under heading "Elong. %", the number "655" should read --555--.

Signed and Sealed this

Twenty-first Day of November, 1989

Attest:

JEFFREY M. SAMUELS

Attesting Officer        Acting Commissioner of Patents and Trademarks